(12) United States Patent
Suzuki

(10) Patent No.: US 11,625,897 B2
(45) Date of Patent: Apr. 11, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Ryota Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/386,545

(22) Filed: Jul. 28, 2021

(65) Prior Publication Data
US 2022/0292778 A1 Sep. 15, 2022

(30) Foreign Application Priority Data
Mar. 12, 2021 (JP) .............................. JP2021-040683

(51) Int. Cl.
*G06T 19/00* (2011.01)
(52) U.S. Cl.
CPC ........ *G06T 19/00* (2013.01); *G06T 2219/004* (2013.01)
(58) Field of Classification Search
CPC .............. G06T 19/00; G06T 2219/004; G06F 2113/14; G06F 2113/16; G06F 3/0484; G06F 30/12; G06F 30/13; G06F 30/20; G06F 30/18; G06F 16/2264; G06F 30/27; G06N 20/00; G06Q 10/0875; G06V 10/44
See application file for complete search history.

(56) References Cited

U.S. PATENT DOCUMENTS

| | | | |
|---|---|---|---|
| 6,542,937 B1 * | 4/2003 | Kask ...................... | G06F 30/00 700/182 |
| 10,105,803 B1 * | 10/2018 | Stevens .................. | B23Q 1/525 |
| 10,190,873 B1 * | 1/2019 | Yamagami ......... | G01B 11/2545 |
| 2002/0118187 A1 * | 8/2002 | Batori ..................... | G06T 19/00 345/419 |
| 2002/0118229 A1 * | 8/2002 | Batori ..................... | G06T 19/00 715/771 |
| 2002/0149625 A1 * | 10/2002 | Shimizu .................. | G06T 19/00 715/771 |

(Continued)

FOREIGN PATENT DOCUMENTS

| | | |
|---|---|---|
| JP | 2002350122 | 12/2002 |
| JP | 2006113846 | 4/2006 |

(Continued)

*Primary Examiner* — Abderrahim Merouan
(74) *Attorney, Agent, or Firm* — JCIPRNET

(57) ABSTRACT

An information processing apparatus includes a processor configured to acquire three-dimensional shape data of a product or a part constituting the product and attribute information given to each of a face and an end portion constituting the three-dimensional shape data, recognize a type of a three-dimensional note regarding the three-dimensional shape data from the attribute information, recognize an orientation and a position where the three-dimensional note is arranged from the three-dimensional shape data, and arrange the three-dimensional note in the three-dimensional shape data in accordance with the type of the three-dimensional note and the orientation and the position where the three-dimensional note is arranged.

11 Claims, 19 Drawing Sheets

(56) References Cited

U.S. PATENT DOCUMENTS

| | | | | |
|---|---|---|---|---|
| 2002/0198611 | A1* | 12/2002 | Stejskal | G06T 19/00 |
| | | | | 700/86 |
| 2007/0013709 | A1* | 1/2007 | Charles | G06T 19/20 |
| | | | | 345/581 |
| 2010/0211352 | A1* | 8/2010 | Morinaga | G03F 9/7046 |
| | | | | 716/54 |
| 2016/0246899 | A1* | 8/2016 | Hirschtick | G06F 30/17 |
| 2017/0364628 | A1* | 12/2017 | Siegel | G06F 30/17 |
| 2018/0365341 | A1* | 12/2018 | Yokohari | G06N 5/022 |
| 2019/0340221 | A1* | 11/2019 | Meriaz | G06F 16/34 |
| 2021/0312099 | A1* | 10/2021 | Apte | G06T 19/20 |

FOREIGN PATENT DOCUMENTS

| | | |
|---|---|---|
| JP | 3875876 | 1/2007 |
| JP | 2018156507 | 10/2018 |

\* cited by examiner

FIG. 9

```
⊟ 🎲 MODEL VIEW
   ⊞ ✓ 📦 "Datum_BC+"
   ⊞ ✓ 📦 "PositionTole_AC+"
   ⊞ ✓ 📦 "PositionTole_BC+"
   ⊞ ✓ 📦 "ScrewHole_EmbossTole_AC+"
   ⊞ ✓ 📦 "ScrewHole_EmbossTole_AC-"
   ⊞ ✓ 📦 "ScrewHole_EmbossTole_BC+"
   ⊞ ✓ 📦 "ScrewHole_EmbossTole_BC-"
   ⊞ ✓ 📦 "Tole_AC+"
   ⊞ ✓ 📦 "Tole_BC+" (WORK)
   ⊞ ✓ 📦 "Tole_BC-"
```
72

DATUM MADE UP OF ONE CYLINDRICAL SURFACE

DATUM MADE UP OF TWO PLANES

DATUM MADE UP OF ONE PLANE

FIG. 20
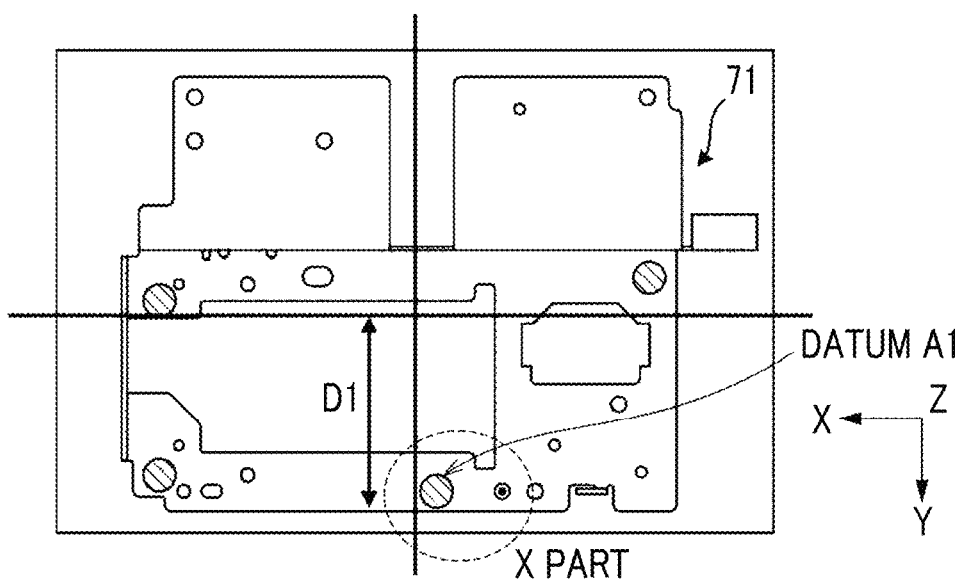
ENLARGED VIEW OF X PART
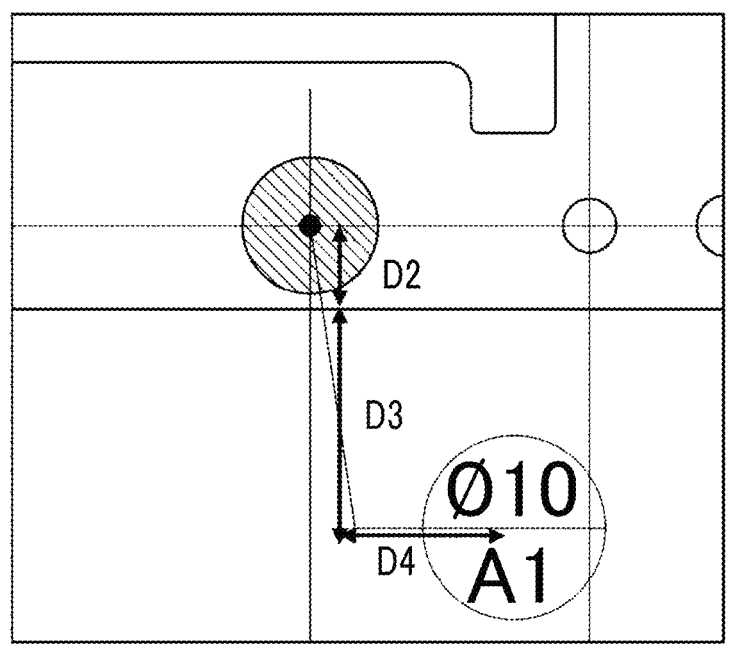

FIG. 21
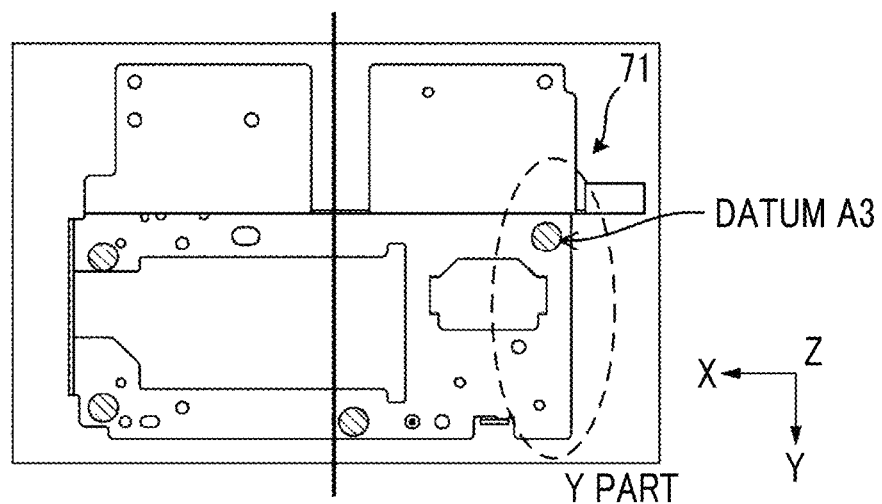
Y PART
ENLARGED VIEW OF Y PART
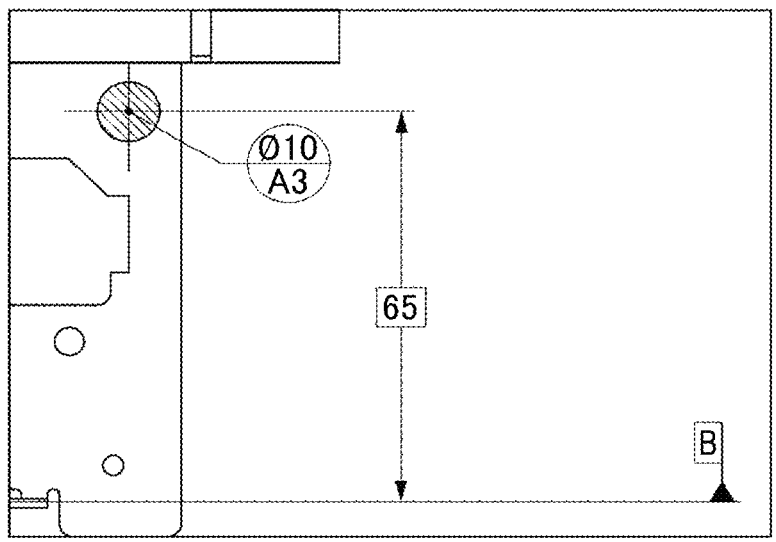

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2021-040683 filed Mar. 12, 2021.

BACKGROUND

(i) Technical Field

The present invention relates to an information processing apparatus and a non-transitory computer readable medium storing an information processing program.

(ii) Related Art

For example, JP3875876B describes a computer aided design (CAD) system for manufacturing a wire harness that converts three-dimensional product/part specification data into conversion data for creating a two-dimensional manufacturing drawing. This CAD system for manufacturing a wire harness includes a three-dimensional CAD data fetch unit that fetches three-dimensional CAD data including three-dimensional shape information indicating a wiring state of the wire harness, circuit information indicating a connection state of various electrical parts via the wire harness, and attribute information that is noteworthy information on manufacturing such as a method of attaching the parts to the wire harness, and an exterior treatment method; a three-dimensional model reproduction unit that reproduces a three-dimensional model of the wire harness on the basis of the three-dimensional shape information of the fetched three-dimensional CAD data; a three-dimensional-two-dimensional model deployment unit that deploys the reproduced three-dimensional model of the wire harness into the two-dimensional model; a two-dimensional model correction unit that corrects the deployed two-dimensional model of the wire harness in accordance with an operator's correction operation; a two-dimensional base drawing creation unit that creates a two-dimensional base drawing of the wire harness by adding apart symbol and required text information to the corrected two-dimensional model on the basis of the circuit information and the attribute information of the three-dimensional CAD data; and a conversion data generation unit for creating the manufacturing drawing, which creates the conversion data for creating the manufacturing drawing of the wire harness on the basis of the created two-dimensional base drawing and the attribute information of the three-dimensional CAD data.

Additionally, JP2006-113846A describes an information processing apparatus that sets an attribute arrangement plane in a 3D model. This information processing apparatus has an attribute input unit that input attribute information for the 3D model, an attribute arrangement plane setting unit that sets a virtual plane with which the attribute information is associated, and a storage unit that stores the attribute information input by the attribute information input unit in association with the attribute arrangement plane set by the attribute arrangement plane setting unit. This attribute arrangement plane setting unit has a first setting method of setting the position and direction of the attribute arrangement plane on the basis of shape elements such as faces, ridgelines, apexes, and central axes of the 3D model or a coordinate system of a space where the 3D model is present; and a second setting method of setting the position and direction of the attribute arrangement plane on the basis of the settings of the attribute information, such as texts and dimensions such as distances, angles, radii, and diameters, which is input to the 3D model by the attribute input unit.

Additionally, JP2002-350122A describes an attribute information processing apparatus that advances, automates, parallelizes, and efficiency-improves respective steps of measurement preparation for inspection, measurement, and measurement result evaluation. This attribute information processing apparatus includes an identifier addition unit that adds an identifier to attribute information on a CAD model, a work information output unit that outputs information required for work such as measurement, a work teaching unit that teaches the work such as measurement, a work result reading unit that reads a work result of the measurement or the like in association with the identifier and the attribute information, and a work result display unit that displays the work result in association with the CAD model. The identifier addition unit includes an identifier history holding unit that holds a history of the added identifier and a history reference identifier addition unit that adds an identifier not in the history to the attribute information by referring to the history of the identifier.

SUMMARY

Meanwhile, for example, in a case where about 1000 parts are newly designed for one product, two-dimensional drawings are created for all the parts. Man-hours of about several hours per part are required for creating the two-dimensional drawings, which accounts for most of the man-hours required for product design.

There is a case where a two-dimensional drawing is automatically created from the three-dimensional shape data by using the shape recognition technique of the three-dimensional shape data. In this case, since the user manually arranges a three-dimensional note regarding the three-dimensional shape data, man-hours are required.

Aspects of non-limiting embodiments of the present disclosure relate to an information processing apparatus and a non-transitory computer readable medium storing an information processing program that can reduce the man-hours for arranging three-dimensional notes as compared to a case where a user manually arranges the three-dimensional notes.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire three-dimensional shape data of a product or a part constituting the product and attribute information given to each of a face and an end portion constituting the three-dimensional shape data, recognize a type of a three-dimensional note regarding the three-dimensional shape data from the attribute information, recognize an orientation and a position where the three-dimensional note is arranged from the three-dimensional shape data, and arrange the three-dimensional note in the three-dimensional shape data in accordance with the type of the three-dimensional note and the orientation and the position where the three-dimensional note is arranged.

BRIEF DESCRIPTION OF THE DRAWINGS

Exemplary embodiment(s) of the present invention will be described in detail based on the following figures, wherein:

FIG. 9 is a diagram showing an example of a model view classification list according to the exemplary embodiment;

FIG. 20 is a diagram provided for explaining a datum arrangement method according to an exemplary embodiment; and FIG. 21 is a diagram for explaining a dimension arrangement method according to an exemplary embodiment.

DETAILED DESCRIPTION

Figure 1:
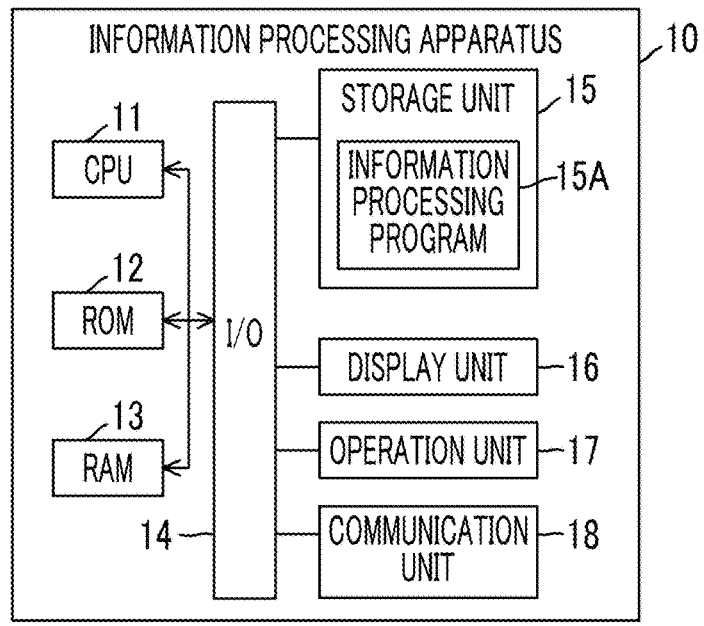
FIG. 1 is a block diagram showing an example of an electrical configuration of an information processing apparatus according to an exemplary embodiment.

Hereinafter, examples of modes for carrying out the technique of the present disclosure will be described in detail with reference to the drawings. In addition, components and processing in which operations, actions, and functions have the identical working maybe given the same reference numerals throughout the drawings, and duplicate descriptions may be appropriately omitted. The respective drawings are merely schematically shown to the extent that the technique of the present disclosure is sufficiently understand. Thus the technique of the present disclosure is not limited to the illustrated examples. Additionally, in the present exemplary embodiment, there is a case where descriptions of configurations not directly related to the present invention and well-known configurations are omitted.

FIG. 1 is a block diagram showing an example of an electrical configuration of an information processing apparatus 10 according to the present exemplary embodiment.

As shown in FIG. 1, the information processing apparatus 10 according to the present exemplary embodiment includes a central processing unit (CPU) 11, a read only memory (ROM) 12, a random access memory (RAM) 13, an input and output interface (I/O) 14, a storage unit 15, a display unit 16, an operation unit 17, and a communication unit 18.

For example, a server computer or a general-purpose computer device such as a personal computer (PC) is applied to the information processing apparatus 10 according to the present exemplary embodiment.

Each of the CPU 11, the ROM 12, the RAM 13, and the I/O 14 is connected via a bus. Each of functional units including the storage unit 15, the display unit 16, the operation unit 17, and the communication unit 18 is connected to the I/O 14. Each of the functional units is mutually communicable with the CPU 11 via the I/O 14.

A control unit is constituted by the CPU 11, the ROM 12, the RAM 13, and the I/O 14. The control unit maybe configured as a sub-control unit that controls a part of the operation of the information processing apparatus 10 or may be configured as a part of a main control unit that controls the entire operation of the information processing apparatus 10. For example, an integrated circuit such as a large scale integration (LSI) or an integrated circuit (IC) chipset is used for a part or all of each block of the control unit. An individual circuit may be used for each of the above blocks, or a circuit in which some or all individual circuits are integrated may be used for each block. Each of the above blocks may be integrally provided, or some blocks may be separately provided. Additionally, a part of each of the above blocks may be separately provided. A dedicated circuit or a general-purpose processor, not limited to the LSI, maybe used for the integration of the control unit.

As the storage unit 15, for example, a hard disk drive (HDD), a solid state drive (SSD), a flash memory, or the like is used. An information processing program 15A according to the present exemplary embodiment is stored in the storage unit 15. In addition, the information processing program 15A may be stored in the ROM 12.

The information processing program 15A may be installed in advance in the information processing apparatus 10, for example. The information processing program 15A may be realized by being stored in a non-volatile storage medium or by being distributed via a network and appropriately installed in the information processing apparatus 10. In addition, as an example of the non-volatile storage medium, a compact disc read only memory (CD-ROM), a magneto-optical disk, an HDD, a digital versatile disc read only memory (DVD-ROM), a flash memory, a memory card, or the like is conceivable.

For example, a liquid crystal display (LCD), an organic electro luminescence (EL) display, or the like is used for the display unit 16. The display unit 16 may integrally have a touch panel. The operation unit 17 is provided with, for example, operation input devices such as a keyboard and a mouse. The display unit 16 and the operation unit 17 receive various instructions from a user of the information processing apparatus 10. The display unit 16 displays various information such as the result of processing executed in response to an instruction received from the user and notification of the processing.

The communication unit 18 is connected to a network such as the Internet, a local area network (LAN), or a wide area network (WAN), and is allowed to communicate with an image forming apparatus or other external devices such as a PC via the network.

Meanwhile, as described above, there is a case where a two-dimensional drawing is automatically created from the three-dimensional shape data by using the shape recognition technique of the three-dimensional shape data. In this case, since the user manually arranges a three-dimensional note regarding the three-dimensional shape data, man-hours are required.

For this reason, the information processing apparatus 10 according to the present exemplary embodiment acquires the three-dimensional shape data of a product or a part constituting the product and attribute information given to each of a face and an end portion constituting the three-dimensional shape data, recognizes the type of the three-dimensional note regarding the three-dimensional shape data from the attribute information, recognizes an orientation and a position where the three-dimensional note is arranged from the three-dimensional shape data, and arranges the three-dimensional note in the three-dimensional shape data in accordance with the type of the three-dimensional note and the orientation and the position where the three-dimensional note is arranged.

Figure 2:
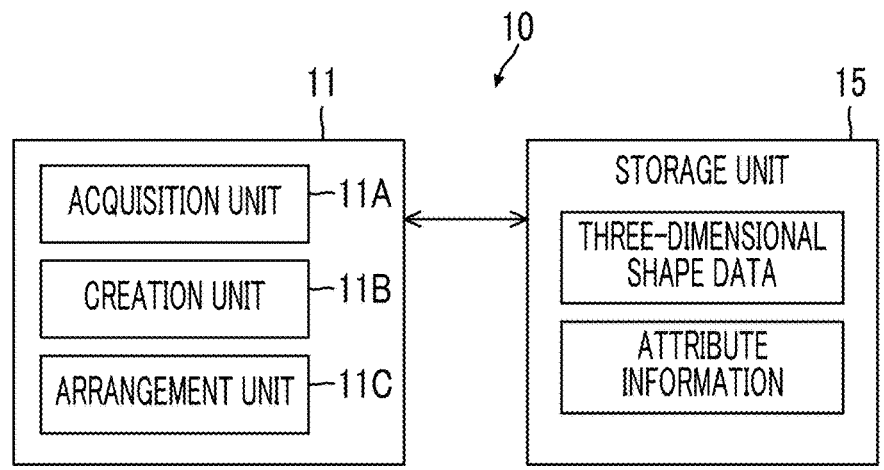
FIG. 2 is a block diagram showing an example of a functional configuration of the information processing apparatus according to the exemplary embodiment.

Specifically, the CPU 11 of the information processing apparatus 10 according to the present exemplary embodiment functions as the respective units shown in FIG. 2 by writing the information processing program 15A stored in the storage unit 15 into the RAM 13 and executing the information processing program 15A. In addition, the CPU 11 is an example of a processor.

FIG. 2 is a block diagram showing an example of a functional configuration of the information processing apparatus 10 according to the present exemplary embodiment.

As shown in FIG. 2, the CPU 11 of the information processing apparatus 10 according to the present exemplary embodiment functions as an acquisition unit 11A, a creation unit 11B, and an arrangement unit 11C.

The storage unit 15 stores the three-dimensional shape data and the attribute information thereof. The three-dimensional shape data is data representing the three-dimensional shape of a product or a part constituting the product, which is created by a designer or the like using a three-dimensional computer aided design (CAD). The attribute information is text information given to each of faces (hereinafter, referred to as "faces") and end portions (hereinafter, referred to as "edges") constituting the three-dimensional shape data. The attribute information includes, for example, datums and dimensional tolerances. The attribute information may further include, for example, at least one of tap holes, mold constraints, or emboss processing in addition to the datums and the dimensional tolerances. In addition, the datums are defined as theoretically accurate geometric references set to determine the posture deviations, position deviations, deflection, or the like of an object. That is, the datums represent faces or lines that serve as references in a case where processing or dimension measurement is performed.

The acquisition unit 11A acquires the three-dimensional shape data and the attribute information thereof from the storage unit 15.

The creation unit 11B creates product and manufacturing information (PMI) including the three-dimensional note from the three-dimensional shape data and the attribute information, which are acquired by the acquisition unit 11A. This PMI is also referred to as product manufacturing information. In this case, the creation unit 11B recognizes the type of the three-dimensional note regarding the three-dimensional shape data from the attribute information and recognizes the orientation and the position where the three-dimensional note is arranged from the three-dimensional shape data.

The arrangement unit 11C arranges the three-dimensional note in the three-dimensional shape data in accordance with the type of the three-dimensional note recognized by the creation unit 11B and the orientation and the position where the three-dimensional note is arranged.

Specifically, the creation unit 11B selects a front view representing a state in which the face or edge to which the attribute information is given is viewed from the front, or a side view representing a state viewed from the side, in accordance with the type of the three-dimensional note.

The three-dimensional note includes, for example, geometrical tolerances in which the datums serving as the references are designated. In this case, the creation unit 11B selects a view in which a face designated as a datum can be seen from the front, out of the front view and the side view. Additionally, the three-dimensional note may include dimensions. In this case, the creation unit 11B selects a view of which the dimensions can be seen from the front, out of the front view and the side view.

Ina case where the front view or the side view is selected, the creation unit 11B recognizes the positional relationship of the face or edge to which the attribute information is given in the product or part, and recognizes the orientation and the position where the three-dimensional note corresponding to the attribute information is arranged, on the basis of the recognized positional relationship. In this case, the arrangement unit 11C arranges the three-dimensional note in the vicinity of the face or edge to which the attribute information is given and at a position not overlapping the product or part, on the basis of the recognition results of the creation unit 11B.

Next, the operation of the information processing apparatus 10 according to the present exemplary embodiment will be described with reference to FIG. 3.

Figure 3:
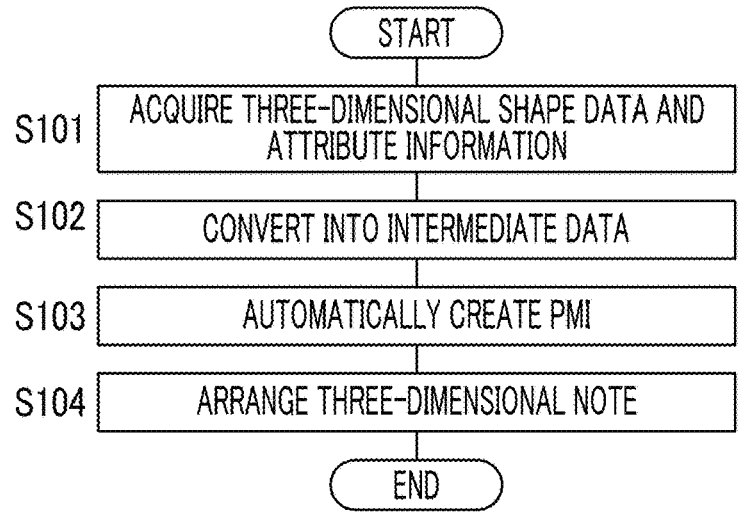
FIG. 3 is a flowchart showing an example of a flow of processing by an information processing program according to the exemplary embodiment.

FIG. 3 is a flowchart showing an example of a flow of processing by the information processing program 15A according to the present exemplary embodiment.

First, in a case where the information processing apparatus 10 is instructed to execute the three-dimensional note arrangement processing, the information processing program 15A is started by the CPU 11 to execute each of the following steps.

In Step S101 of FIG. 3, the CPU 11 acquires the three-dimensional shape data and the attribute information thereof from the storage unit 15.

Figure 4:
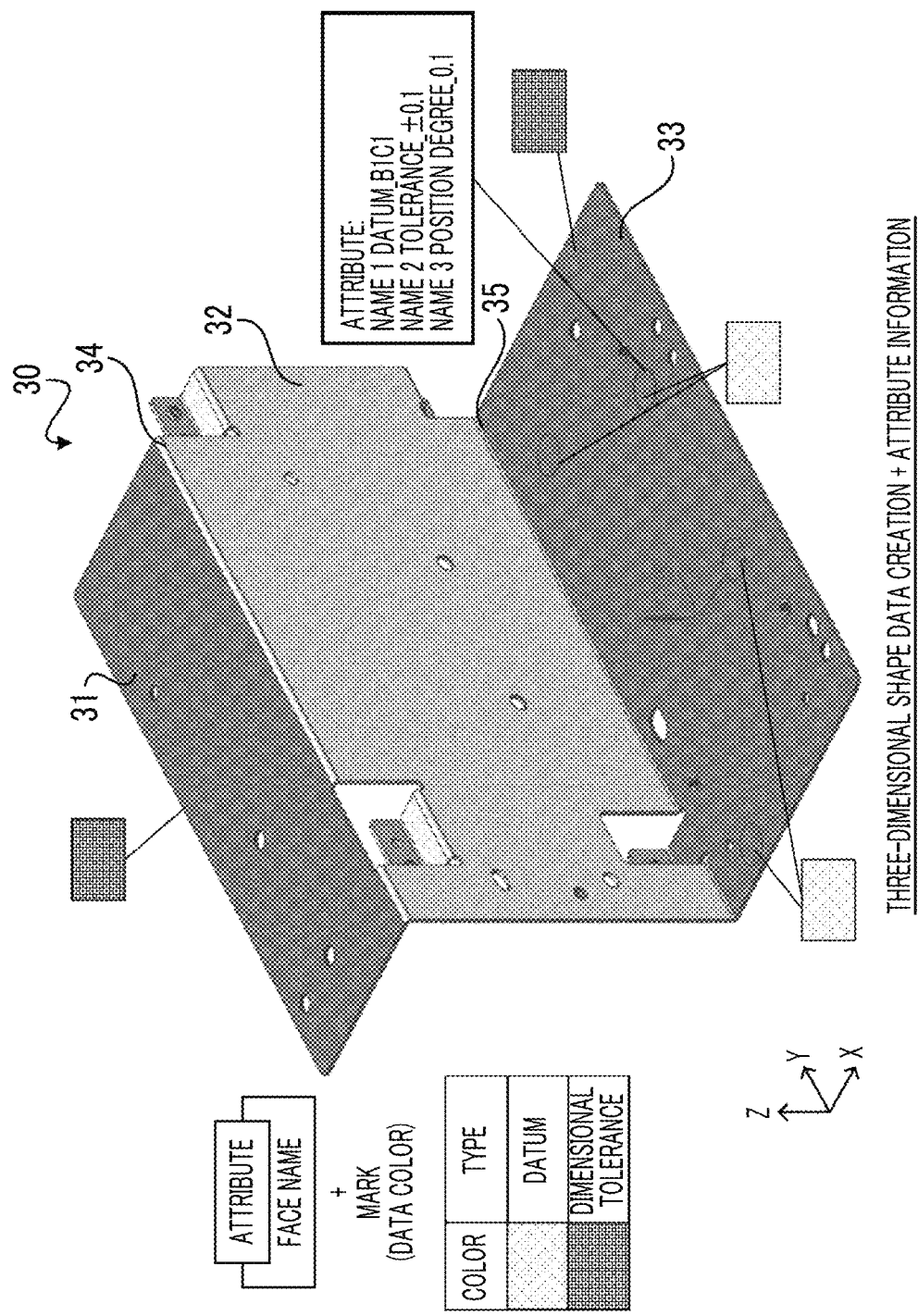
FIG. 4 is a perspective view showing an example of three-dimensional shape data of a part according to the exemplary embodiment.

FIG. 4 is a perspective view showing an example of the three-dimensional shape data of a part 30 according to the present exemplary embodiment.

The part 30 shown in FIG. 4 is represented as, for example, the three-dimensional shape data created by the designer or the like using the three-dimensional CAD. In addition, an arrow Z shown in the drawing indicates a part upward-downward direction (vertical direction), an arrow X indicates a part width direction (horizontal direction), and an arrow Y indicates a part depth direction (horizontal direction).

The part 30 includes a lower surface 33 extending in the width direction and the depth direction, a wall surface 32 extending in an upward direction from a lower end portion 35 of the lower surface 33, and an upper surface 31 extending parallel to and in the opposite orientation to the lower surface 33 from an upper end portion 34 of the wall surface 32.

The attribute information is given to each of the faces and edges of the part 30 shown in FIG. 4 in advance. In addition, this attribute information is input via an attribute addition user interface (UI) screen (not shown). In the example of FIG. 4, the attribute information is given to each of the upper surface 31, the wall surface 32, the lower surface 33, the upper end portion 34, and the lower end portion 35. This attribute information includes at least datums and dimensional tolerances. In the case of face attribute information, for example, a face name and a mark (data color) are given. The attribute information is color-coded and visualized for each type. For example, the datums are shown in yellow and the dimensional tolerances are shown in blue. In the example of FIG. 4, a difference in color is expressed by a difference in hatching. In addition, in the example of FIG. 4, the upper surface 31 is represented in blue colors of the dimensional tolerances, and the lower surface 33 is represented in yellow colors of the datums and blue colors of the dimensional tolerance.

In Step S102, the CPU 11 converts the three-dimensional shape data acquired in Step S101 into intermediate data. In addition, the data format of the intermediate data is not particularly limited, but for example, a JT format or the like, which is relatively often used, is used.

Figure 5:
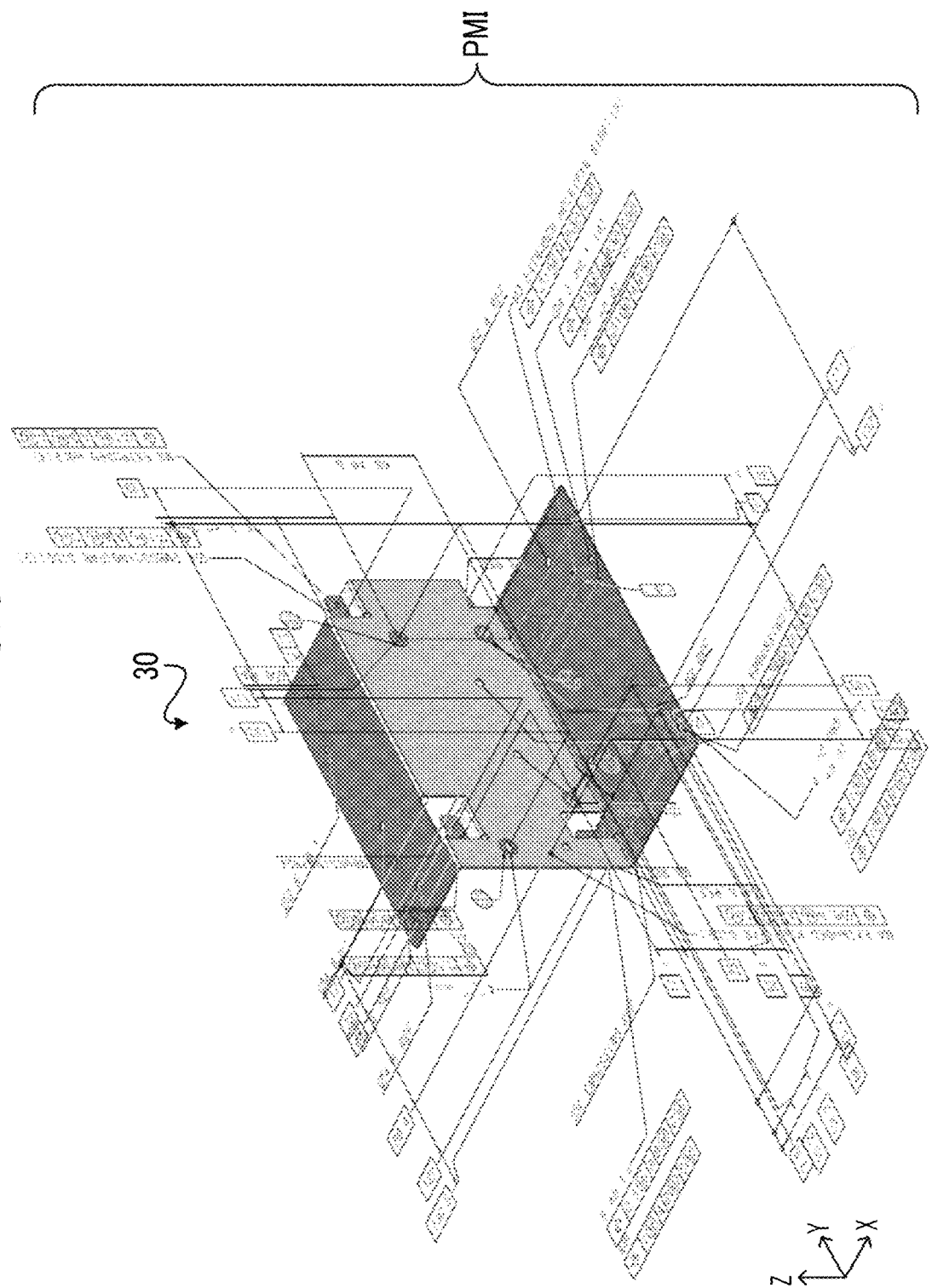
FIG. 5 is a perspective view showing an example of the three-dimensional shape data and PMI of the part according to the exemplary embodiment.

In Step S103, the CPU 11 automatically creates the PMI shown in FIG. 5 as an example on the basis of the three-dimensional shape data converted into the intermediate data and the attribute information thereof in Step S102.

FIG. 5 is a perspective view showing an example of the three-dimensional shape data and PMI of the part 30 according to the present exemplary embodiment.

The PMI shown in FIG. 5 includes the three-dimensional note (for example, dimensions, geometrical tolerances, notes, and the like) regarding the three-dimensional shape data. The dimensions of the three-dimensional note are acquired using a known shape recognition technique. According to this shape recognition technique, it is possible to recognize the shape of each element (for example, a straight line, a curved line, a hole, a rib, a burring, or the like) constituting the part 30 and measure the dimensions of each element. Additionally, the geometrical tolerances and the notes in the three-dimensional note are acquired from the attribute information. That is, the dimensions are acquired by the shape recognition of the three-dimensional shape data, and the geometrical tolerance and the notes are acquired from the attribute information.

Here, a method of recognizing the shape of a burring constituting a bracket, which is an example of the part, will be specifically described with reference to FIG. 6, FIG. 7A, and FIG. 7B. In addition, the element serving as a recognition target is not limited to the burring, and various elements can also be recognized.

Figure 6:
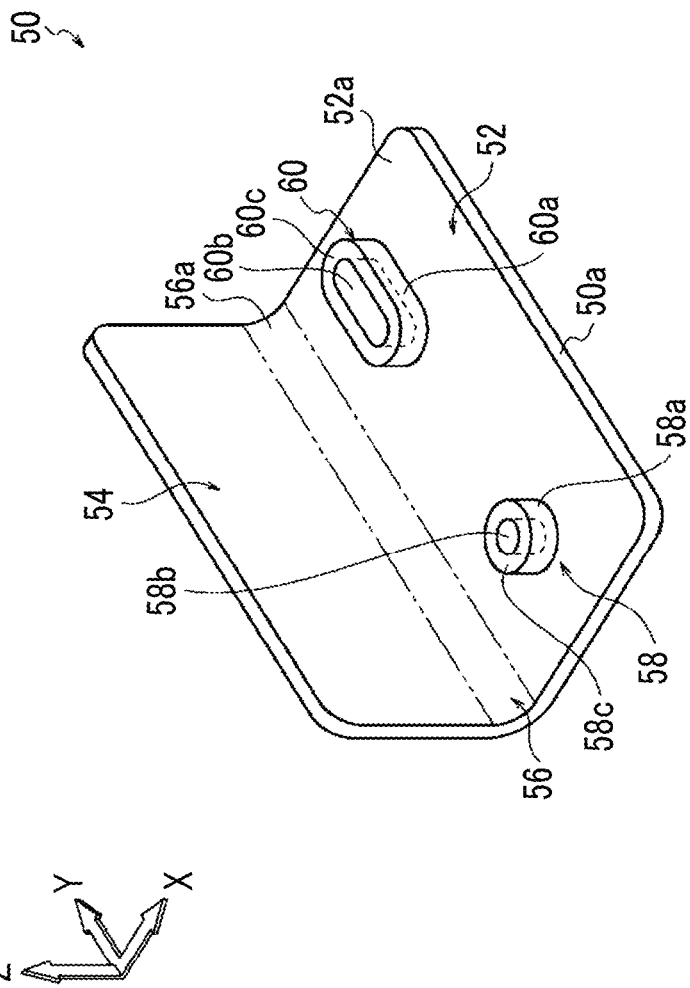
FIG. 6 is a perspective view showing an example of a bracket according to the exemplary embodiment.

FIG. 6 is a perspective view showing an example of the bracket 50 according to the present exemplary embodiment. FIG. 7A is a plan view showing an example of the bracket 50 according to the present exemplary embodiment, and FIG. 7B is a side view showing an example of the bracket 50 according to the present exemplary embodiment.

As shown in FIG. 6, the bracket 50 has an end surface 50a, and the bracket 50 is formed with a flat plate-shaped base portion 52 of which a plate surface faces in the upward-downward direction, a flat plate-shaped wall portion 54 of which a plate surface faces in the width direction, and a connecting portion 56 connecting the base portion 52 and the wall portion 54 to each other. A plate surface 52a is formed on the base portion 52, and a curved surface 56a is formed on the connecting portion 56. Moreover, a burring 58 and a burring 60 are formed on the base portion 52. Here, the "burring" is a tubular portion formed on a flat plate portion.

First, the CPU 11 acquires the plate thickness information of the bracket 50 from the three-dimensional shape data.

Next, the CPU 11 determines whether or not the bracket 50 is formed with an inner peripheral surface having a height of, for example, 1.5 times or more the plate thickness. Here, the "inner peripheral surface" is a surface orthogonal to the plate surface of a plate material (in the present example, the plate surface of the base portion 52), and is a surface that is connected all around and faces inward.

Figure 7B:
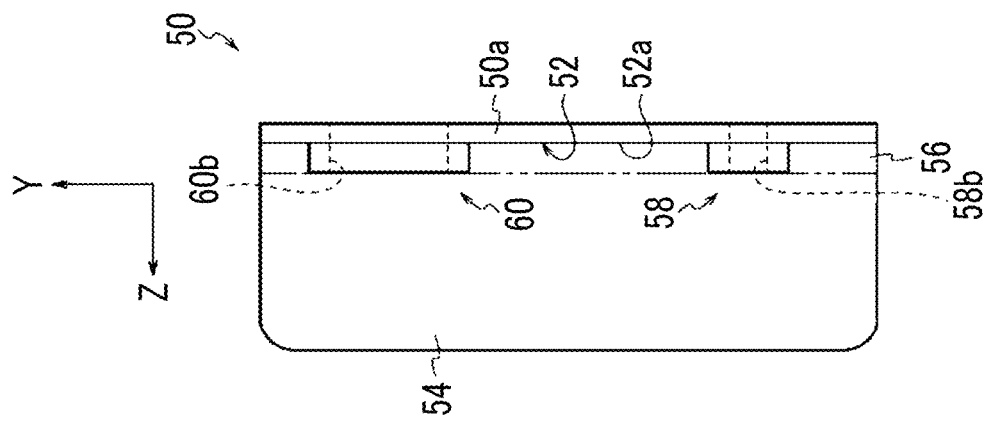
FIG. 7B is a side view showing an example of the bracket according to the exemplary embodiment.
Figure 7A:
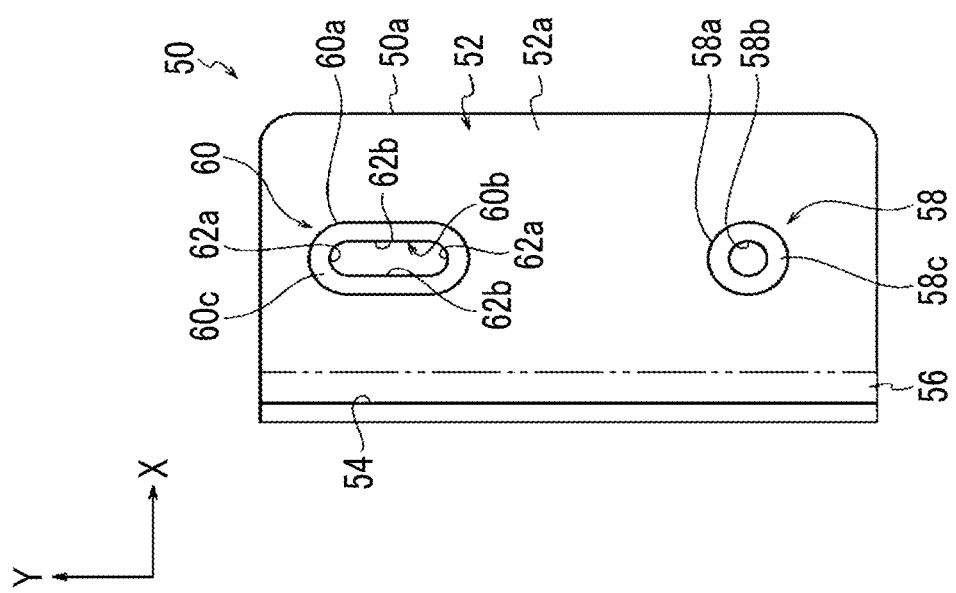
FIG. 7A is a plan view showing an example of the bracket according to the exemplary embodiment.

In the present example, inner peripheral surfaces 58b and 60b of the burrings 58 and 60 have a height of 1.5 times or more the plate thickness as shown in FIG. 6, FIG. 7A, and FIG. 7B, and surfaces orthogonal to the plate surface 52a of the base portion 52 and surfaces that are connected all around and faces inward. For this reason, the CPU 11 determines that the bracket 50 is formed with the inner peripheral surfaces 58b and 60b having a height of 1.5 times or more the plate thickness.

In a case where the inner peripheral surfaces are formed, the CPU 11 determines whether or not the inner peripheral surfaces 58b and 60b are constituted by one curved surface or two curved surfaces and two flat surfaces. In the present example, the inner peripheral surface 58b is constituted by one curved surface as shown in FIG. 7A. Additionally, the inner peripheral surface 60b is constituted by two curved surfaces 62a facing each other in the depth direction and two flat surfaces 62b facing each other in the width direction. For this reason, the CPU 11 determines that the inner peripheral surface 58b is constituted by one curved surface and the inner peripheral surface 60b is constituted by two curved surfaces and two flat surfaces.

In a case where the inner peripheral surfaces 58b and 60b are constituted by one curved surface or two curved surfaces and two flat surfaces, the CPU 11 determines whether not a torus surface or oval ring surface surrounded with two ridgelines is formed at the distal end of the inner peripheral surface 58b or 60b. In the present example, as shown in FIG. 6 and FIG. 7A, the torus surface 58c surrounded by two ridgelines is formed at the distal end of the inner peripheral surface 58b. Additionally, the oval ring surface 60c surrounded by two ridgelines is formed at the distal end of the inner peripheral surface 60b. For this reason, the CPU 11 determines that the torus surface 58c or the oval ring surface 60c surrounded by the two ridgelines is formed at the distal end of the inner peripheral surfaces 58b or 60b.

In a case where a torus surface or an oval ring surface surrounded by two ridgelines is formed at the distal end of the inner peripheral surface 58b or 60b, the CPU 11 determines whether or not an outer peripheral surface extending in the height direction is formed outside the torus surface 58c or the oval ring surface 60c. Here, the "outer peripheral surface" is a surface orthogonal to the plate surface of a plate material (in the present example, the plate surface of the base portion 52), and is a surface that is connected all around and faces outward.

In the present example, as shown in FIG. 6 and FIG. 7A, the outer peripheral surfaces 58a and 60a of the burrings 58 and 60 are surfaces orthogonal to the plate surface of the base portion 52 and surfaces that are connected all around on and faces outward. For this reason, the CPU 11 determines that the outer peripheral surfaces 58a and 60a that are orthogonal to the plate surface of the base portion 52 and that are connected all around and face the outside are formed.

In a case where the outer peripheral surface is formed, the CPU 11 recognizes the burring 58 as a circular hole burring and the burring 60 as an elongated hole burring.

In addition, in order to recognize the shape of a rib as an element, for example, the technique described in JP2018-156507A may be applied.

In a case where the PMI is automatically created, the CPU 11 recognizes the type of the three-dimensional note regarding the three-dimensional shape data from the attribute information and recognizes the orientation and the position where the three-dimensional note is arranged from the three-dimensional shape data. The CPU 11 selects a front view representing a state in which the face or edge to which the attribute information is given is viewed from the front, or a side view representing a state viewed from the side, in accordance with the type of the three-dimensional note.

In a case where the front view or the side view is selected, the CPU 11 recognizes the positional relationship of the face or edge to which the attribute information is given in the product or part, and recognizes the orientation and the position where the three-dimensional note corresponding to the attribute information are arranged, on the basis of the recognized positional relationship.

In Step S104, the CPU 11 arranges the three-dimensional note in the vicinity of the face or edge to which the attribute information is given in the three-dimensional shape data and at a position not overlapping the product or part, on the basis of the recognition results recognized in Step S103, and ends a series of processing performed by the information processing program 15A.

Figure 8:
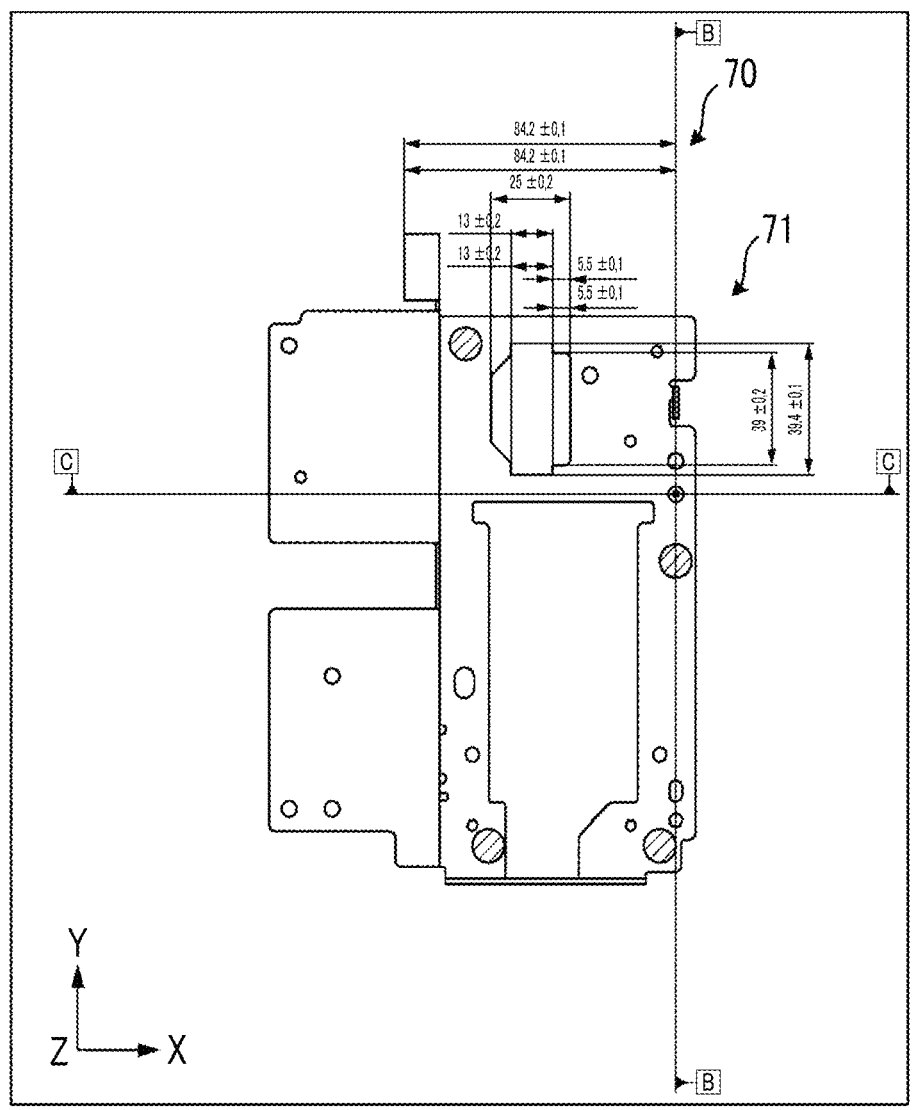
FIG. 8 is a front view showing an example of a three-dimensional model in which a three-dimensional note according to the exemplary embodiment is arranged.

FIG. 8 is a front view showing an example of the three-dimensional model 71 in which the three-dimensional note 70 according to the present exemplary embodiment is arranged. In addition, the three-dimensional model 71 is an example of the part.

As shown in FIG. 8, the type of the three-dimensional note 70 is recognized from the attribute information possessed by the face and the edge, the orientation and the position where the three-dimensional note 70 is arranged is recognized by the shape recognition of the three-dimensional model 71 represented as the three-dimensional shape data, and the three-dimensional note 70 is arranged at an appropriate position of the three-dimensional model 71 on the basis of the recognition results.

FIG. 9 is a diagram showing an example of a model view classification list 72 according to the present exemplary embodiment.

In the model view classification list 72 shown in FIG. 9, a view to be arranged for each type of the three-dimensional note 70 is classified. Types of three-dimensional note 70 include, for example, datums (also referred to as datum targets), position crossings, screw hole embossing, geometrical tolerances, and the like. In the example of FIG. 9, "Datum" represents a datum, "Position Tole" represents a position crossing, "ScrewHole_EmbossTole" represents screw hole embossing, and "Tole" represents a geometrical tolerance. In a case where "Tole BC+" (work) in FIG. 9 is selected, the three-dimensional model 71 shown in FIG. 10 is displayed as an example.

Figure 10:
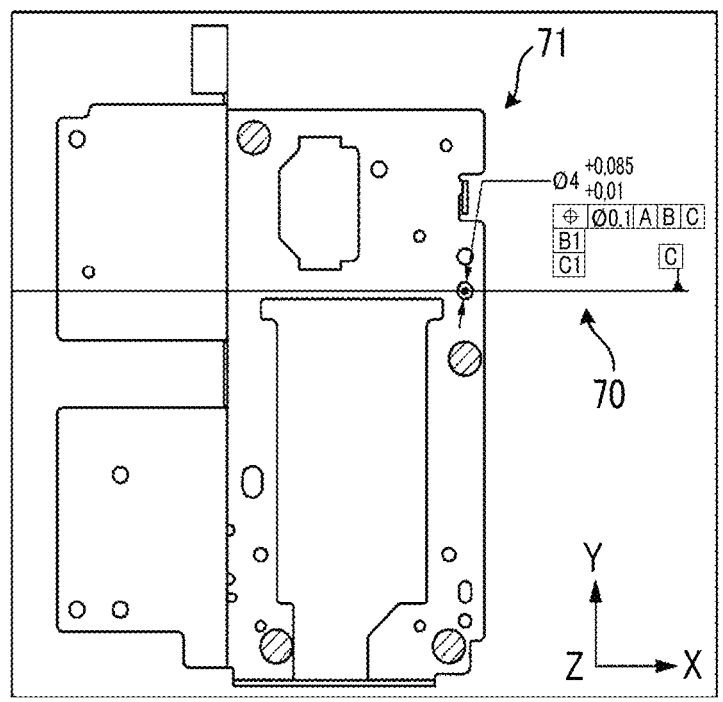
FIG. 10 is a front view showing another example of the three-dimensional model in which the three-dimensional note according to the exemplary embodiment is arranged.

FIG. 10 is a front view showing another example of the three-dimensional model 71 in which the three-dimensional note 70 according to the present exemplary embodiment is arranged.

As shown in FIG. 10, whether a front view or a side view of the face and edge to which the attribute information is given is determined depending on the type of the three-dimensional note 70. Then, by the shape recognition of the three-dimensional model 71, where the face or edge to which the attribute information is given is located in the three-dimensional model is specified, and the three-dimensional note 70 is arranged in the vicinity of the face or edge and at a position not overlapping the three-dimensional model 71.

Next, an example of a method of creating a datum as an example of the three-dimensional note will be described with reference to FIG. 11 and FIG. 12.

Figure 11:
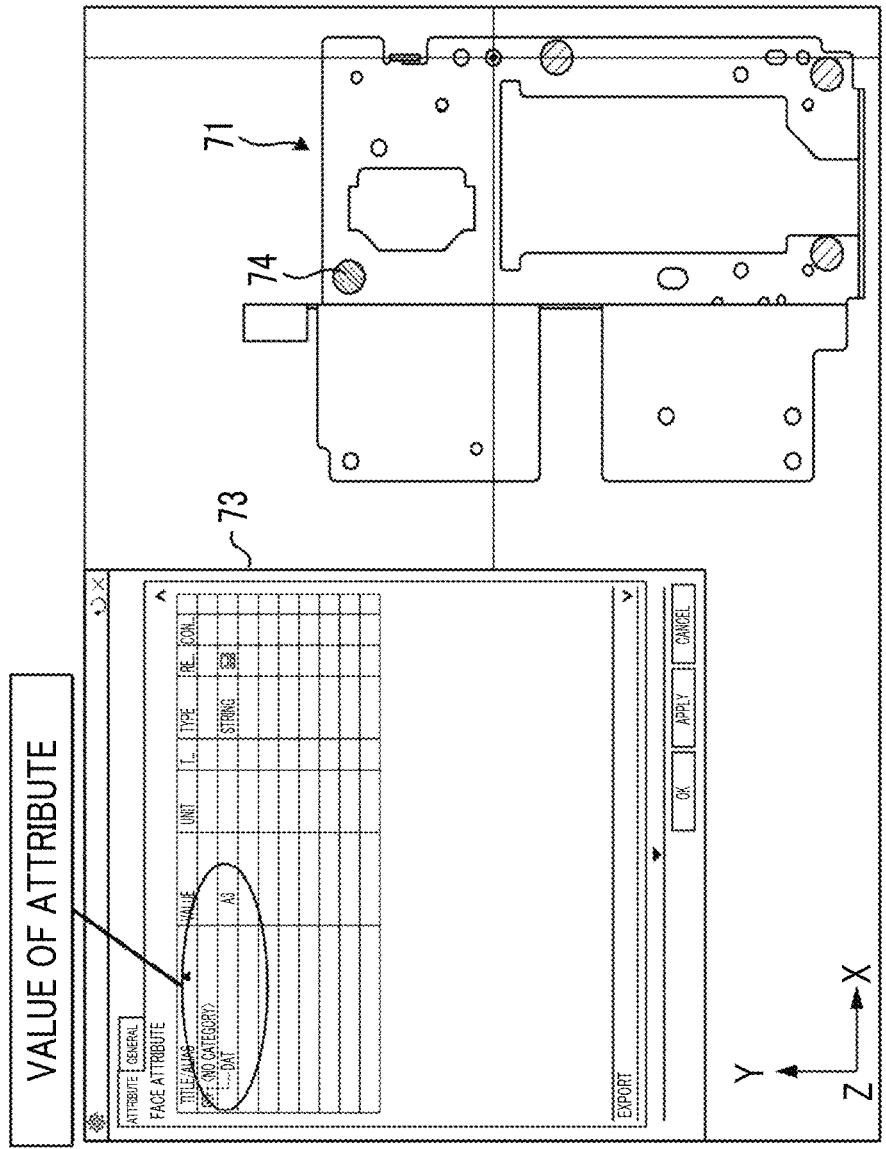
FIG. 11 is a diagram provided for explaining a datum creation method according to the exemplary embodiment.
Figure 12:
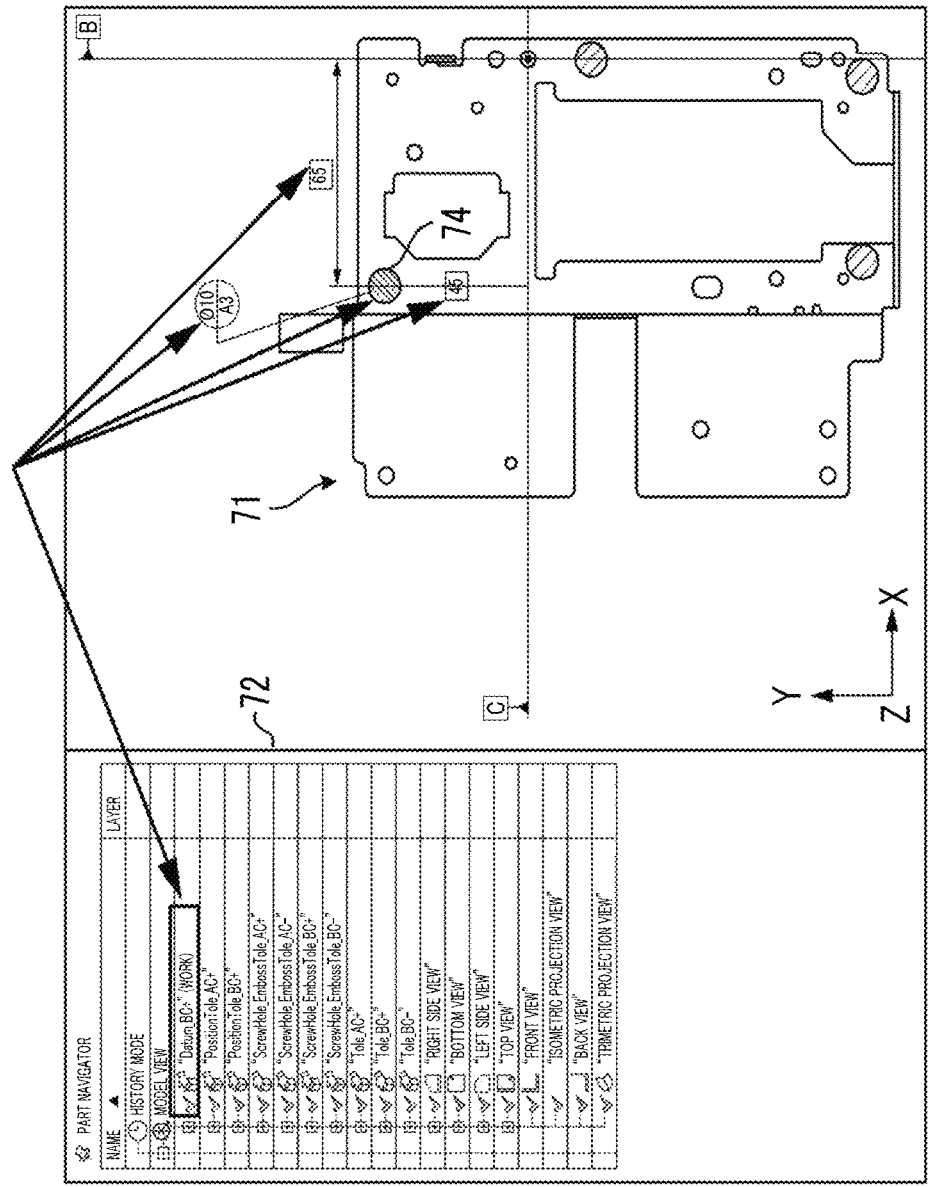
FIG. 12 is a diagram for explaining the datum creation method according to the exemplary embodiment.

FIG. 11 and FIG. 12 are diagrams for explaining the datum creation method according to the present exemplary embodiment.

In a face property 73 shown in FIG. 11, the value of an attribute attached to the face is shown. In the example of FIG. 11, the attribute of a datum A face is given to a face 74 of the three-dimensional model 71. For the datum, a view in which a face (a face to which an attribute is given) serving as a target of the datum can be seen from the front, that is, a view from a normal direction of the face serving as a target of the datum is selected.

In the model view classification list 72 shown in FIG. 12, "Datum_BC+" (work), which is a view in the + direction of a BC plane of a datum system (Datum_OO), is selected. For this "Datum_BC +" (work), a datum number is acquired from the attribute information given to the face 74, and the diameter of the datum and the dimension from a datum reference are acquired by the shape recognition of the three-dimensional model 71. For example, an oblique line is formed so that the face 74 to which the datum attribute is given can be identified.

Next, with reference to FIG. 13, an example of a method of creating external dimensions will be described as another example of the three-dimensional note.

Figure 13:
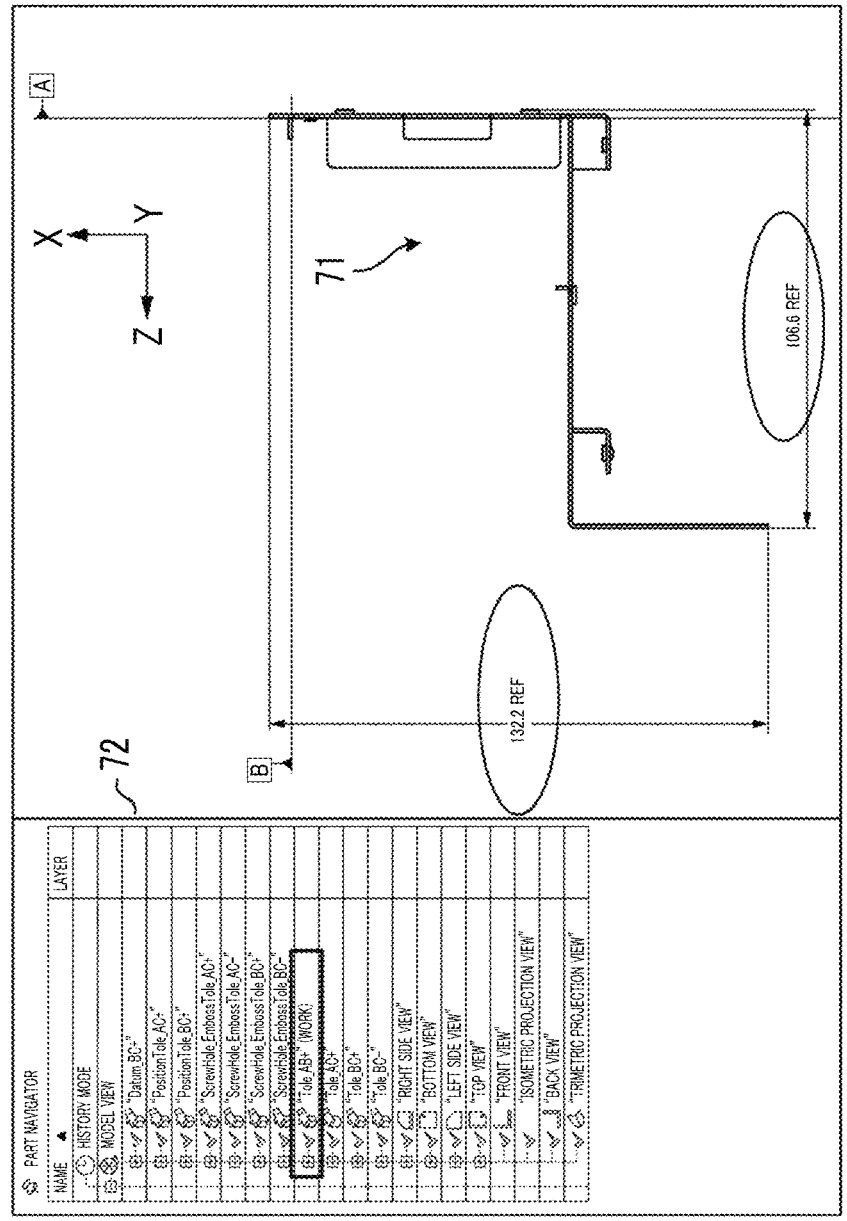
FIG. 13 is a diagram provided for explaining an external dimension creation method according to an exemplary embodiment.

FIG. 13 is a diagram provided for explaining the external dimension creation method according to the present exemplary embodiment.

In the model view classification list 72 shown in FIG. 13, "Tole_AB+" (work), which is a view of a tolerance system (Tole_OO), is selected. From the shape recognition of the three-dimensional model 71, an external dimension in a datum A direction, an external dimension in a datum B direction, and an external dimension in a datum C direction are acquired, and a view in which each external dimension can be seen from the front is recognized and arranged. In the example of FIG. 13, external dimensions are created on an AB plane so that the respective dimensions in the datum A direction and the datum B direction can be seen from the front. In addition, for the dimension in the datum C direction, an external dimension is created on an AC plane. In the determination of +/−, in a case where there is a view direction that has already been created, a priority is given to +/− of a view direction that has already been created. The external dimensions (dimensions surrounded by an ellipse) are arranged at positions offset outward from the edge of the three-dimensional model 71 so as not to overlap the three-dimensional model 71.

Next, an example of a method of creating the contour degree as an example of the three-dimensional note will be described with reference to FIG. 14 and FIG. 15.

Figure 14:
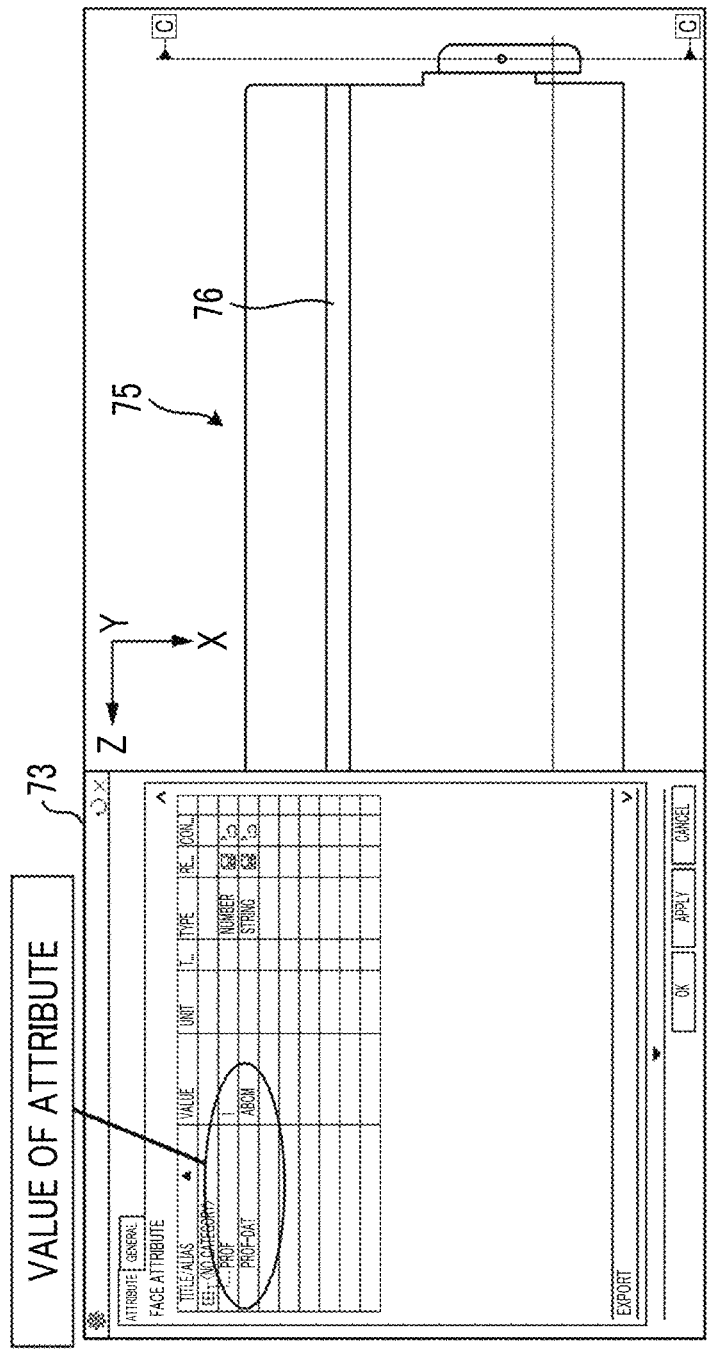
FIG. 14 is a diagram provided for explaining a contour degree creation method according to the exemplary embodiment.
Figure 15:
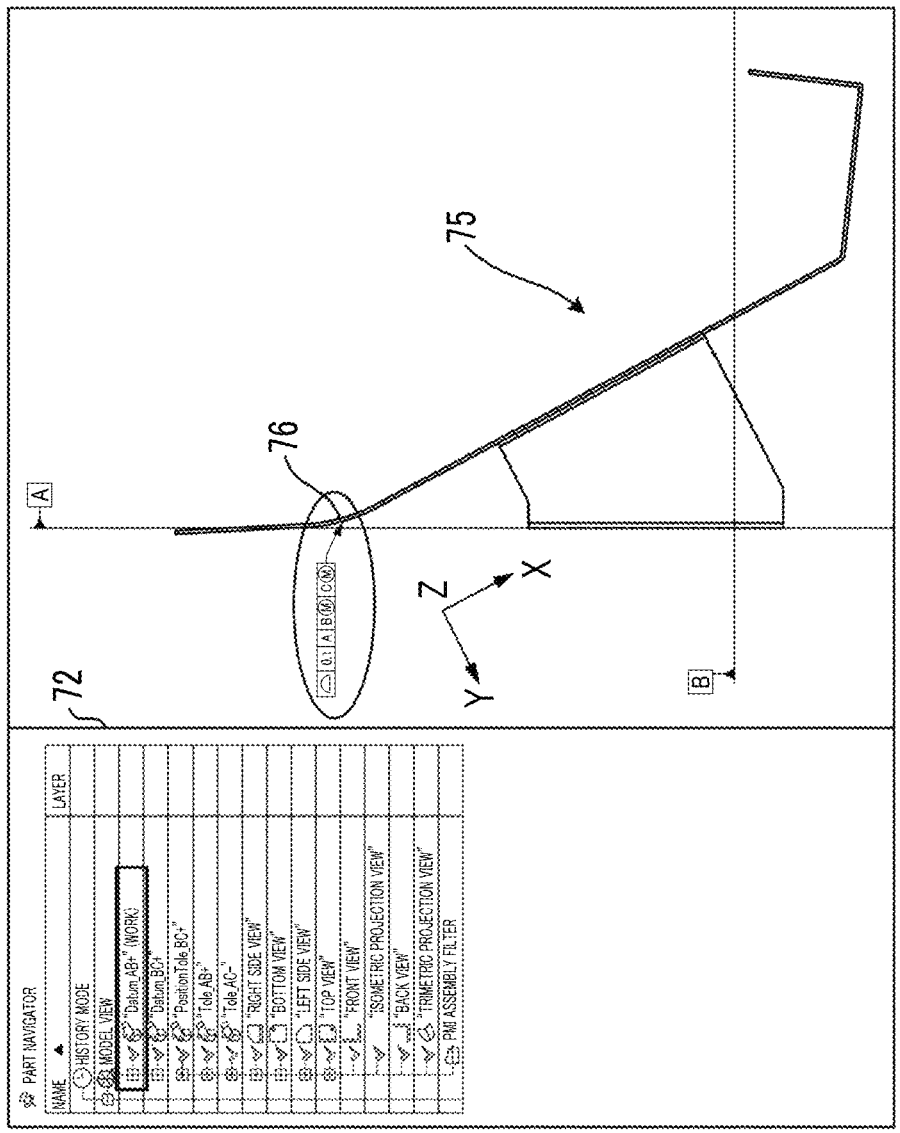
FIG. 15 is a diagram provided for explaining the contour degree creation method according to the exemplary embodiment.

FIG. 14 and FIG. 15 are diagrams provided for explaining the contour degree creation method according to the present exemplary embodiment.

In the face property 73 shown in FIG. 14, the value of the attribute attached to the face is shown. In the example of FIG. 14, the attribute of the contour degree (geometrical tolerance) is given to the face 76 of the three-dimensional model 75. For the contour degree, a view in which a face (a face to which an attribute is given) serving as a target of the contour degree can be seen from the side is selected.

In the model view classification list 72 shown in FIG. 15, "Datum_AB+" (work), which is a view in the + direction of the AB plane of the datum system (Datum_OO), is selected. For this "Datum_AB+" (work), a contour degree is acquired from the attribute information given to the face 76. The contour degree is arranged in a view in which the face 76 can be seen from the side. The contour degree is arranged at a position offset outward from the edge of the three-dimensional model 75 so as not to overlap the three-dimensional model 75.

Next, with reference to FIG. 16 to FIG. 20, a PMI arrangement algorithm in a case where a datum, which is an example of the three-dimensional note, is applied will be specifically described.

Figure 16:
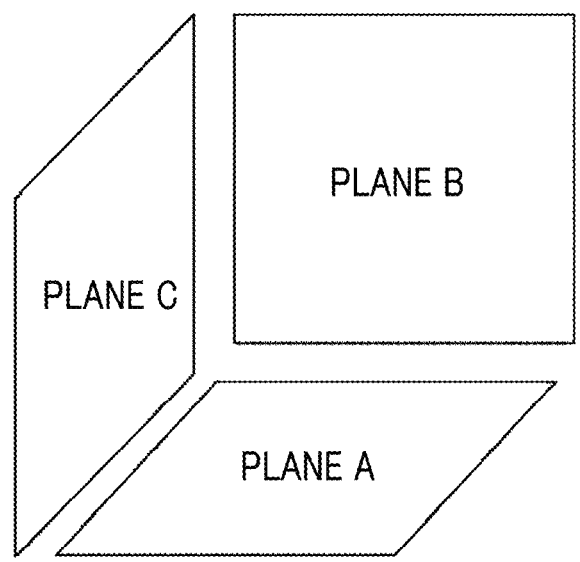
FIG. 16 is a diagram provided for explaining a view definition method of a PMI arrangement algorithm according to the exemplary embodiment.

FIG. 16 is a diagram for explaining a view definition method of the PMI arrangement algorithm according to the present exemplary embodiment.

Figure 17:
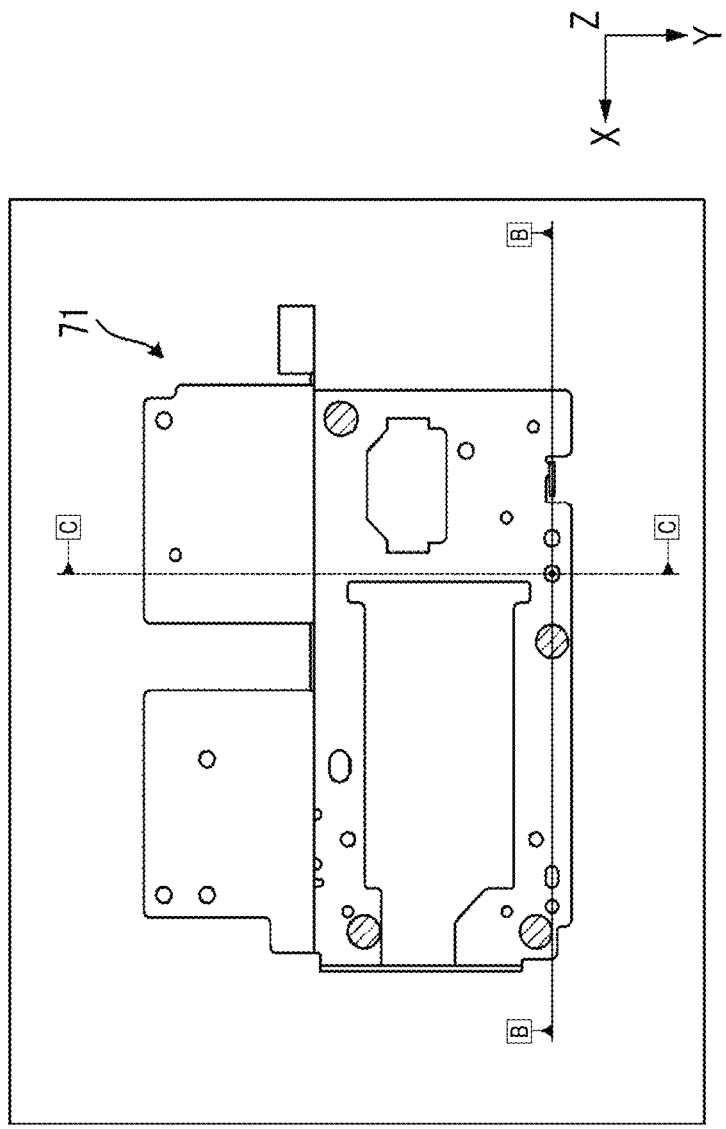
FIG. 17 is a front view showing an example of a view of a datum plane A of the three-dimensional model according to the exemplary embodiment as viewed from a + direction.

As shown in FIG. 16, a datum plane A, a datum plane B, and a datum plane C are defined. Views are defined by the attributes of the datums. In the example of FIG. 16, classification is made into the following six views.
 v1: View of datum plane A from + direction
 v2: View of datum plane A from − direction
 v3: View of datum plane B from + direction
 v4: View of datum plane B from − direction
 v5: View of datum plane C from + direction
 v6: View of datum plane C from − direction FIG. 17 is a front view showing an example of the view of the datum plane A of the three-dimensional model 71 according to the present exemplary embodiment as viewed from the + direction. That is, the example of FIG. 17 shows view v1.

In Processing 1 of the PMI arrangement algorithm, the CPU 11 recognizes the attributes as shown in FIG. 18A to FIG. 18D as an example.

Figure 18C:
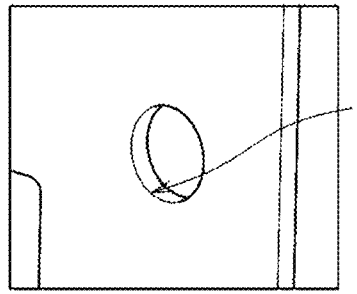
FIG. 18C is a diagram showing an example of a datum made up of one cylindrical surface.
Figure 18B:
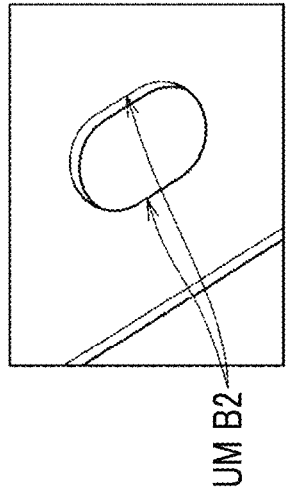
FIG. 18B is a diagram showing an example of a datum made up of two planes.
Figure 18A:
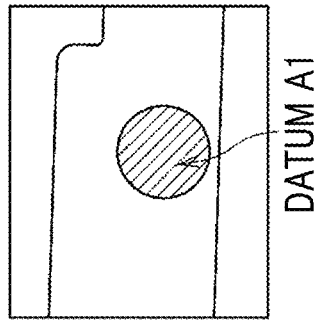
FIG. 18A is a diagram showing an example of a datum made up of one plane.
Figure 18D:
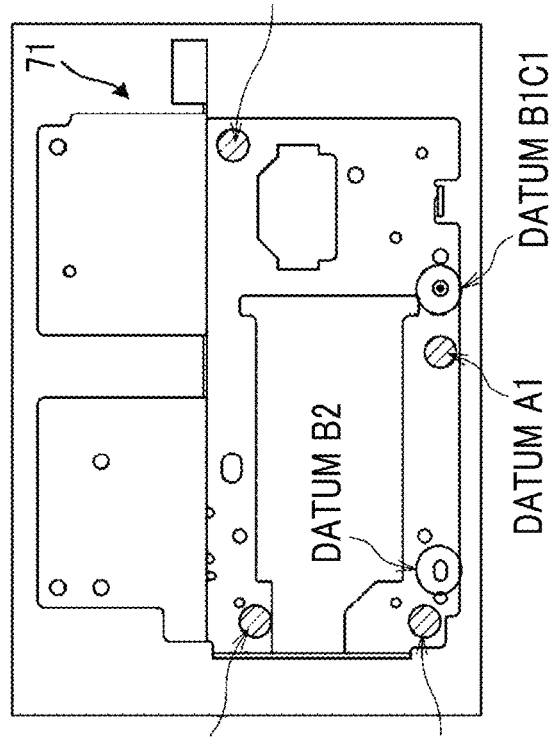
FIG. 18D is a front view showing an example of the three-dimensional model having a plurality of datums.

FIG. 18A is a diagram showing an example of a datum made up of one plane. Additionally, FIG. 18B is a diagram showing an example of a datum made up of two planes. Additionally, FIG. 18C is a diagram showing an example of a datum made up of one cylindrical surface. Additionally, FIG. 18D is a front view showing an example of the three-dimensional model 71 having a plurality of datums.

The CPU 11 recognizes a face having a datum attribute. Then, as shown in FIG. 18A, the CPU 11 recognizes a datum made up of one plane. In the example of FIG. 18A, a datum A1 shown in FIG. 18D is recognized. The same applies to datums A2 to A4 shown in FIG. 18D. Additionally, as shown in FIG. 18B, the CPU 11 recognizes a datum made up of two planes. In the example of FIG. 18B, a datum B2 shown in FIG. 18D is recognized. Additionally, as shown in FIG. 18C, the CPU 11 recognizes a datum made up of one cylindrical surface. In the example of FIG. 18C, a datum B1C1 shown in FIG. 18D is recognized.

Next, in Processing 2 of the PMI arrangement algorithm, the CPU 11 selects a view in which the three-dimensional note is arranged from the views v1 to v6 on the basis of the attributes recognized in Processing 1.

Figure 19:
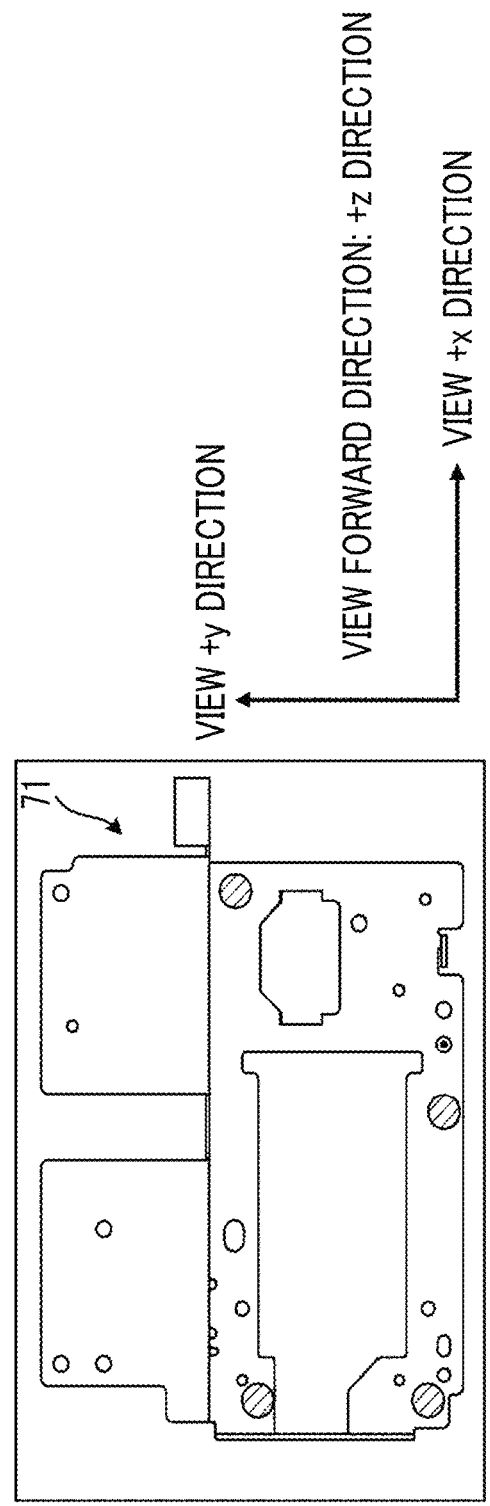
FIG. 19 is a diagram provided for explaining a view selection method according to the exemplary embodiment.

FIG. 19 is a diagram provided for explaining a view selection method according to the present exemplary embodiment.

In the case of one plane shown in FIG. 18A, the CPU 11 selects a view of which the normal direction is the view +z direction from the above views v1 to v6 in FIG. 19. Additionally, in the case of the two planes shown in FIG. 18B, the CPU 11 searches a view of which the shape can be recognized among four vectors orthogonal to two normal directions in FIG. 19 from the above views v1 to v6. In a case where two views are applicable, the view of a datum plane viewed from the + direction is preferentially selected. However, in a case where a corresponding spot cannot be seen in a case of viewing from the + direction is selected, the view from the − direction is selected. Additionally, in the case of one cylindrical surface shown in FIG. 18C, the CPU 11 searches a view in which the axial direction of the cylindrical surface is the view +z direction from the above views v1 to v6 in FIG. 19. In a case where two views are applicable, the view of a datum plane viewed from the + direction is preferentially selected. However, in a case where a corresponding spot cannot be seen in a case of viewing from the + direction is selected, the view from the − direction is selected.

Next, in Processing 3 of the PMI arrangement algorithm, the CPU 11 arranges the datum, which is an example of the three-dimensional note, in the vicinity of the face or edge of the three-dimensional model 71 and at a position not overlapping the three-dimensional model 71, on the basis of the view selected in the above Processing 2.

FIG. 20 is a diagram provided for explaining a datum arrangement method according to the present exemplary embodiment. A lower drawing of FIG. 20 is an enlarged view of an X part of the three-dimensional model 71 shown in an upper drawing of FIG. 20.

As shown in FIG. 20, the CPU 11 divides the three-dimensional model 71 into four regions by a vertical line extending through the center of the three-dimensional model 71 in the vertical direction and a horizontal line extending through the center of the three-dimensional model 71 in the horizontal direction.

For example, in a case where a target of the datum A1 is arranged, the CPU 11 recognizes the positional relationship of a datum plane A1 serving as the target in the three-dimensional model 71. In addition, a distance D1 indicates the distance from the center of the three-dimensional model 71 to the edge of the three-dimensional model 71. A distance D2 indicates the distance from the datum plane A1 (center), which is the target, to the edge of the three-dimensional model 71. In the example of FIG. 20, the datum plane A1 is recognized to be located on the right side and below the center of the three-dimensional model 71.

The CPU 11 recognizes which edge of the three-dimensional model 71 the datum plane A1 is closer to. In the example of FIG. 20, the datum plane A1 is recognized as being close to a lower edge of the three-dimensional model 71.

The CPU 11 arranges a datum (φ10/A1 in the example of FIG. 20) at a position separated by (distance D2+distance D3) in the vertical direction and separated in the horizontal direction by a distance D4 from the center of the datum plane A1. In addition, a distance D3 indicates an offset distance in the vertical direction, and a distance D4 indicates an offset distance in the horizontal direction. The distances D3 and D4 are preset values such that the datum does not overlap the three-dimensional model 71.

Next, with reference to FIG. 21, the PMI arrangement algorithm in a case where the dimensions, which are an example of the three-dimensional note, are applied will be specifically described.

First, in Processing 4 and Processing 5 of the PMI arrangement algorithm in a case where the dimensions are applied, the same processing as Processing 1 and Processing 2 in the PMI arrangement algorithm in a case where the above-described datum is applied is performed, the attributes are recognized (Processing 4), and a view to be arranged (Processing 5) is selected.

Next, in Processing 6 of the PMI arrangement algorithm, the CPU 11 arranges the dimensions, which are an example of the three-dimensional note, in the vicinity of the face or edge of the three-dimensional model 71 and at a position not overlapping the three-dimensional model 71, on the basis of the view selected in the above Processing 5.

FIG. 21 is a diagram for explaining the dimension arrangement method according to the present exemplary embodiment. A lower drawing of FIG. 21 is an enlarged view of a Y part of the three-dimensional model 71 shown in an upper drawing of FIG. 21.

As shown in FIG. 21, the CPU 11 divides the three-dimensional model 71 into two regions by a vertical line extending in the vertical direction through the center of the three-dimensional model 71.

For example, in a case where a dimension in the vertical direction is arranged, the CPU 11 recognizes the positional relationship of a face (a datum plane A3 in the example of FIG. 21) serving as a target in the three-dimensional model 71. In the example of FIG. 21, the datum plane A3 is recognized to be located on the right side of the center of the three-dimensional model 71.

The CPU 11 arranges a dimension ("65" in the example of FIG. 21) in the vertical direction at a position offset in the horizontal direction from an end portion of the three-dimensional model 71. In addition, the offset distance is a preset value such that the dimensions do not overlap the three-dimensional model 71 and the other three-dimensional notes.

In this way, according to the present exemplary embodiment, the type of the three-dimensional note regarding the three-dimensional shape data is recognized from the attribute information given to the face or the end portion of the three-dimensional shape data, an orientation and a position where the three-dimensional note is arranged is recognized from the three-dimensional shape data, and the three-dimensional note is arranged in the three-dimensional shape data in accordance with the type of the three-dimensional note and the orientation and the position where the three-dimensional note is arranged. Accordingly, the man-hours for arranging the three-dimensional note are reduced as compared to a case where the user manually arranges the three-dimensional note.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The information processing apparatus according to the exemplary embodiment has been illustrated and described above. The exemplary embodiments may be in the form of programs for causing a computer to execute the functions of the respective units included in the information processing apparatus. The exemplary embodiments may be in the form of a non-temporary storage medium that can be read by the computer that stores these programs.

In addition, the configurations of the information processing apparatus described in the above exemplary embodiments are examples, and may be changed depending on the situation within a range that does not depart from the gist.

Additionally, the flow of processing of the program described in the above exemplary embodiments is also an example, and unnecessary steps may be deleted, new steps may be added, or the processing order may be changed within a range that does not depart from the gist.

Additionally, in the above-described exemplary embodiments, a case where the processing according to the exemplary embodiments is realized by a software configuration using a computer by executing the program has been described, but the present invention is not limited to this. The exemplary embodiments may be realized by, for example, a hardware configuration or a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire three-dimensional shape data of a product or a part constituting the product and attribute information given to each of a face and an end portion constituting the three-dimensional shape data;
recognize a type of a three-dimensional note regarding the three-dimensional shape data from the attribute information;
recognize an orientation and a position where the three-dimensional note is arranged from the three-dimensional shape data, the attribute information comprises a datum representing a face or a line that serves as a reference in a case where processing or dimension measurement is performed, in a case of the datum is recognized by the processor as one plane, the processor selects a view of which a normal direction is a positive z direction, in a case of the datum is recognized as two planes, the processor searches a view of which a shape can be recognized among four vectors orthogonal to two normal directions of the two planes, in a case of the datum is recognized as one cylindrical surface, the processor searches a view in which an axial direction of the cylindrical surface is a positive z direction, and arrange the three-dimensional note in the three-dimensional shape data in accordance with the type of the three-dimensional note and the orientation and the position where the three-dimensional note is arranged.

2. The information processing apparatus according to claim 1, wherein the processor is configured to:

select a front view representing a state in which the face or the end portion to which the attribute information is given is viewed from a front, or a side view representing a state in which the face or the end portion to which the attribute information is given viewed from a side, in accordance with the type of the three-dimensional note.

3. The information processing apparatus according to claim 2, wherein the processor is configured to:

in a case where the front view or the side view is selected, recognize a positional relationship of the face or the end portion to which the attribute information is given in the product or the part, recognize the orientation and the position where the three-dimensional note corresponding to the attribute information is arranged, on the basis of the recognized positional relationship, and arrange the three-dimensional note in the vicinity of the face or the end portion to which the attribute information is given and at a position not overlapping the product or the part.

4. The information processing apparatus according to claim 3, wherein the three-dimensional note includes a geometrical tolerance in which a datum serving as a reference is designated, and the processor is configured to:

select a view in which the face designated as the datum is seen from the front out of the front view and the side view.

5. The information processing apparatus according to claim 3, wherein the three-dimensional note includes a dimension, and the processor is configured to:

select a view in which the dimension is seen from the front out of the front view and the side view.

6. The information processing apparatus according to claim 2, wherein the three-dimensional note includes a geometrical tolerance in which a datum serving as a reference is designated, and the processor is configured to:

select a view in which the face designated as the datum is seen from the front out of the front view and the side view.

7. The information processing apparatus according to claim 2, wherein the three-dimensional note includes a dimension, and the processor is configured to:

select a view in which the dimension is seen from the front out of the front view and the side view.

8. The information processing apparatus according to claim 1, wherein the processor is configured to:

create the three-dimensional note from the three-dimensional shape data and the attribute information.

9. The information processing apparatus according to claim 8, wherein the three-dimensional note includes at least one of a dimension, a geometrical tolerance, or a note, and the processor is configured to:

acquire the dimension by shape recognition of the three-dimensional shape data, and acquires the geometrical tolerance and the note from the attribute information.

10. A non-transitory computer readable medium storing an information processing program causing a computer to execute a process comprising:

acquiring three-dimensional shape data of a product or a part constituting the product and attribute information given to each of a face and an end portion constituting the three-dimensional shape data;

recognizing a type of a three-dimensional note regarding the three-dimensional shape data from the attribute information;

recognizing an orientation and a position where the three-dimensional note is arranged from the three-dimensional shape data, the attribute information comprises a datum representing a face or a line that serves as a reference in a case where processing or dimension measurement is performed, in a case of the datum is recognized as one plane, a view of which a normal direction is a positive z direction is selected, in a case of the datum is recognized as two planes, a view of which a shape can be recognized among four vectors orthogonal to two normal directions of the two planes is searched, in a case of the datum is recognized as one cylindrical surface, a view in which an axial direction of the cylindrical surface is a positive z direction is searched, and arranging the three-dimensional note in the three-dimensional shape data in accordance with the type of the three-dimensional note and the orientation and the position where the three-dimensional note is arranged.

11. An information processing apparatus comprising:

A computer graphics unit (CPU) configured to:

acquire three-dimensional shape data of a product or a part constituting the product and attribute information given to each of a face and an end portion constituting the three-dimensional shape data;

recognize a type of a three-dimensional note regarding the three-dimensional shape data from the attribute information;

recognize an orientation and a position where the three-dimensional note is arranged from the three-dimensional shape data, the attribute information comprises a datum representing a face or a line that serves as a reference in a case where processing or dimension measurement is performed, in a case of the datum is recognized as one plane, a view of which a normal direction is a positive z direction is selected, in a case of the datum is recognized as two planes, a view of which a shape can be recognized among four vectors orthogonal to two normal directions of the two planes is searched, in a case of the datum is recognized as one cylindrical surface, a view in which an axial direction of the cylindrical surface is a positive z direction is searched, and arrange the three-dimensional note in the three-dimensional shape data in accordance with the type of the three-dimensional note and the orientation and the position where the three-dimensional note is arranged.

* * * * *